United States Patent [19]

Sato et al.

[11] Patent Number: 5,225,502
[45] Date of Patent: Jul. 6, 1993

[54] METHOD OF PRODUCING POLYOLEFIN

[75] Inventors: Morihiko Sato; Hitoshi Ito, both of Yokkaichi; Mitsuhiro Mori, Aichi; Yozo Kondo, Yokkaichi, all of Japan

[73] Assignee: Tosoh Corporation, Shinnanyo, Japan

[21] Appl. No.: 630,861

[22] Filed: Dec. 20, 1990

[30] Foreign Application Priority Data

Dec. 25, 1989 [JP] Japan .................. 1-332872

[51] Int. Cl.$^5$ .................. C08F 4/654; C08F 4/656; C08F 10/00
[52] U.S. Cl. .................. 526/128; 502/125; 526/124; 526/125; 526/903; 526/904; 526/352
[58] Field of Search .................. 526/124, 128

[56] References Cited

U.S. PATENT DOCUMENTS

| | | | |
|---|---|---|---|
| 3,901,863 | 8/1975 | Beyer et al. | 526/114 |
| 4,130,699 | 12/1978 | Hoff et al. | 526/124 |
| 4,405,769 | 9/1983 | Capshew et al. | 526/116 |
| 4,463,145 | 7/1984 | Sunada et al. | 526/119 |
| 4,478,951 | 10/1984 | Huff | 526/904 |
| 4,482,638 | 11/1984 | Fries | 526/903 |
| 4,543,400 | 9/1985 | Wristers | 526/904 |
| 4,579,836 | 4/1986 | Arzarimanidis et al. | 526/904 |
| 4,804,726 | 2/1989 | Kondo et al. | 526/127 |
| 4,952,649 | 8/1990 | Kioka et al. | 526/125 |
| 5,037,910 | 8/1991 | Cook et al. | 526/128 |

FOREIGN PATENT DOCUMENTS

| | | |
|---|---|---|
| 0125910 | 11/1984 | European Pat. Off. |
| 231878 | 8/1987 | European Pat. Off. |
| 0303704 | 2/1989 | European Pat. Off. |
| 2552120 | 5/1976 | Fed. Rep. of Germany |
| 60-72903 | 4/1985 | Japan |

*Primary Examiner*—Edward J. Smith
*Attorney, Agent, or Firm*—Oblon, Spivak, McClelland, Maier & Neustadt

[57] ABSTRACT

A method of producing a polyolefin, which comprises polymerizing at least one olefin in the presence of a catalyst system comprising (A) a catalyst component prepared by bringing ethylene and/or an α-olefin in contact with a solid composite obtained by reacting a reaction product, which has been produced by reacting a uniform solution containing
  (i) at least one member selected from the group consisting of metal magnesium and hydroxylated organic compound, and oxygen-containing organic compounds of magnesium and
  (ii) at least one oxygen-containing organic compound of titanium with
  (iii) at least one organoaluminum compound and/or
  (iv) at least one silicon compound, with
  (v) at least one aluminum halide compound, thereby allowing the ethylene and/or the α-olefin to be absorbed into the solid composite, and (B) at least one catalyst component selected from the group consisting of organometallic compounds of metals of Groups Ia, IIa, IIb, IIIb and IVb of the Periodic Table.

10 Claims, 1 Drawing Sheet

FIG. 1

(A) TRANSITION-METAL COMPONENTS (i) AT LEAST ONE MEMBER SELECTED FROM THE GROUP CONSISTING OF METAL MAGNESIUM, AND HYDROXYLATED ORGANIC COMPOUND, AND OXYGEN-CONTAINING ORGANIC COMPOUNDS OF MAGNESIUM

→ REACTION →

(ii) AN OXYGEN-CONTAINING ORGANIC COMPOUND OF Ti (iii) AN ORGANOALUMINUM COMPOUND (iv) A SILICON COMPOUND (v) AN ALUMINUM HALIDE COMPOUND

→ REACTION →

ETHYLENE AND/OR α-OLEFIN (B) ORGANOMETALLIC CATALYST COMPONENT

AN ORGANOMETALLIC COMPOUND OF A METAL OF GROUPS Ia, IIa, IIb AND IVb

→ CONTACT/ABSORPTION → POLYOLEFIN

METHOD OF PRODUCING POLYOLEFIN

BACKGROUND OF THE INVENTION

1. Field of the Invention

The invention relates to a method of producing a polyolefin comprising polymerizing at least one olefin in the presence of a novel catalyst.

2. Discussion of Background

It is already known to use a catalyst system comprising a transition-metal compound and an organometallic compound for low-pressure polymerization of olefins. A catalyst system containing as one component a reaction product of an inorganic or organic magnesium compound with a transition-metal compound is also known as a highly active catalyst.

Japanese Patent Publication Nos. 15110/1977 and 27677/1977 suggest polymerization methods that can produce polyolefins quite high in impact resistance, in which methods use is made of a catalyst system quite high in activity comprising a catalyst component (A) obtained by reacting magnesium metal with a hydroxylated organic compound or an oxygen-containing organic compound of magnesium, an oxygen-containing organic compound of a transition metal and an aluminum halide and a catalyst component (B) of an organometallic compound.

However, polymer particles obtained in the presence of these catalysts are still not satisfactory in the powder properties because the average particle diameter is small, the particle size distribution is wide, and the proportion of fine particles in the polymer particles is high.

That is, if there are such defects, when a polyolefin is produced, various troubles are caused, for example, in the step of separation of particles from the polymer slurry, in the drying step, in the step of transporting the particles, and in the step of pelletizing particles and in some cases long-term continuous production becomes impossible. Further in the cases wherein a polymer is obtained by multi-stage polymerization, if the particle size distribution of the polymer particles is wide, after the drying stage, classification of the powder is liable to occur in the stage where an additive is added or in the stage of transportation, influencing adversely the quality because the physical properties differ from particle to particle, which cannot be ignored sometimes.

We found that the particle diameter of a polymer could be increased by using a silicon compound in addition to a raw material of a catalyst component (A) disclosed, for example, in Japanese Patent Publication No. 15110/1977 and filed a patent application (Japanese Patent Publication No. 58367/1987), but it could not lead to an improvement in the particle size distribution.

Further, we found an improvement in the particle size distribution by partially reducing a raw material of a catalyst component (A) disclosed, for example, in Japanese Patent Publication No. 15110/1977 mentioned above, i.e., a uniform solution containing magnesium and titanium (hereinafter referred to as Mg-Ti solution) with an organoaluminum compound followed by reaction with a silicon compound and then with an aluminum halide compound and filed a patent application (Japanese Unexamined Patent Publication No. 262802/1985}, but it resulted in that the particle diameter was not great enough. Particularly, when the molecular weight distribution was broadened, that tendency became conspicuous and the catalyst particles crumbled readily in the transportation stage and polymerization stage.

Many measures for improving the shape of particles of a polymer such as above means have long been suggested and a process known as preliminary polymerization is one of them. For example, according to Japanese Unexamined Patent Publication No. 172503/1984, a process is disclosed for obtaining a non-crumbling catalyst composition by preliminarily polymerizing propylene with a linear $C_8$–$C_{18}$ α-olefin using titanium trichloride compound. However, if this process is applied to polymerization for obtaining a polyethylene by using a catalyst carried on magnesium used in the present invention, the effect of improving a particle diameter and a bulk density is little. Further, Japanese Unexamined Patent Publication No. 215301/1984 discloses a process wherein preliminary polymerization treatment is carried out using butene-1 or 4-methyl-1-pentene in the presence of a catalyst component comprising magnesium, titanium, and halogen as essential components and an organoaluminum compound catalyst component, optionally followed by additional preliminary polymerization treatment with ethylene, propylene or 3-methyl-1-pentene. However, when the present inventors have studied the process, it has been found that since preliminary polymerization is carried out in the presence of an organoaluminum compound catalyst component, the activity of the catalyst is difficult to control and the purpose cannot be attained adequately.

SUMMARY OF THE INVENTION

The present invention intends to improve considerably the powder properties of polymer particles without impairing the advantages of the process for producing a polymer disclosed in Japanese Patent Publication No. 15110/1987 mentioned above that can produce a polymer having a narrow molecular weight distribution under a high activity of a catalyst.

The present inventors have found that a polymer, which has a large particle diameter, is excellent in powder properties, and is hardly crumbled, by reacting a raw material of a catalyst component (A) disclosed in Japanese Patent Publication No. 15110/1987 mentioned above, i.e., an Mg-Ti solution with an organoaluminum compound and a silicon compound, followed by reaction with an aluminum halide compound to produce a solid composite and then treating the composite with ethylene and/or an α-olefin, leading to the completion of the present invention.

That is, the present invention is directed to a method of producing a polyolefin, which comprises at least one olefin is polymerized in the presence of a catalyst system comprising:

(A) a catalyst component prepared by bringing ethylene and /or an α-olefin in contact with a solid composite obtained by reacting a reaction product, which has been produced by reacting a uniform solution containing (i) at least one member selected from the group consisting of metal magnesium and hydroxylated organic compound, and oxygen-containing organic compounds of magnesium and (ii) at least one oxygen-containing organic compound of titanium with (iii) at least one organoaluminum compound and/or (iv) at least one silicon compound, with (v) at least one aluminum halide compound, thereby allowing the ethylene and/or the α-olefin to be absorbed into the solid composite, and (B) at least one catalyst component selected from the group consisting of organometallic compounds of metals of Groups Ia, IIa, IIb, IIIb and IVb of the Periodic Table.

BRIEF DESCRIPTION OF THE DRAWING

FIG. 1 is a flowchart for the preparation process of a catalyst in accordance with the present ivention.

DETAILED DESCRIPTION OF THE INVENTION

Metal magnesium and hydroxylated organic compounds, and oxygen-containing compounds of magnesium that are reactants (i) used in the preparation of the solid composite in the present invention are listed below. First, when metal magnesium and a hydroxylated organic compound are used, metal magnesium can take any form such as powdery form, granular form, foil form, and ribbon form, and as a hydroxylated organic compound, alcohols, organosilanols, and phenols are suitable.

As the alcohols, linear or branched aliphatic alcohols having 1 to 18 carbon atoms or alicyclic alcohols can be used.

Examples include methanol, ethanol, n-propanol, i-propanol, n-butanol, i-butanol, n-hexanol, 2-ethylhexanol, n-octanol, i-octanol, n-stearyl alcohol, cyclopentanol, cyclohexanol, and ethylene glycol.

The organosilanols are those having at least one hydroxyl group and an organic group selected from an alkyl group, a cycloalkyl group, an arylalkyl group, an aryl group, an alkylaryl group, and an aromatic group with 1 to 12, preferably 1 to 6, carbon atoms.

For example, the following compounds can be mentioned: trimethylsilanol, triethylsilanol, triphenylsilanol, and t-butyldimethylsilanol, and, as phenols, phenol, cresol, xylenol, and hydroquinone.

These hydroxylated organic compounds can be used alone or as a mixture of two or more of them. Although it is of course possible to use them alone, specific effects can be created to the powder properties of the polymer if two or more of them are used in combination.

In addition, when metal magnesium is used to prepare a solid composite of the present invention, for the purpose of accelerating the reaction, it is preferable to add one or more substances that will react with metal magnesium or form an adduct, i.e., polar substances such as organic acids, organic acid esters, halogenated alkyls, mercuric chloride, and iodine.

As compounds belonging to oxygen-containing organic compounds of magnesium, the following compounds can be mentioned: magnesium alkoxides such as magnesium methylate, magnesium ethylate, magnesium isopropylate, magnesium decanolate, magnesium methoxyethylate, and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate, and magnesium cresolate, magnesium carboxylates such as magnesium acetate, magnesium stearate, magnesium benzoate, magnesium phenylacetate, magnesium adipate, magnesium sebacate, magnesium phthalate, magnesium acrylate, magnesium oleate, magnesium oxymates such as magnesium butyloxymate, magnesium dimethylglyoxymate, and magnesium cyclohexyloxymate, magnesium hydroxamates, magnesium hydroxylamine salts such as N-etroso-N-phenylhydroxylamine derivatives, magnesium enolates such as magnesium acetylacetonate, magnesium silanolates such as magnesium triphenylsilanolate, and complex alkoxides of magnesium with other metal such as $Mg[Al(OC_2H_5)_4]_2$. These oxygen-containing organic magnesium compounds are used alone or as a mixture of two or more of them. As an oxygen-containing organic compound of titanium that is the above-mentioned reactant (ii), a compound having the general formula represented by $[TiOa(OR^2)b]m$ is used, in which the formula $R^2$ represents a hydrocarbon group such as a linear or branched alkyl group having 1 to 20, preferably 1 to 10, carbon atoms, a cycloalkyl group, an arylalkyl group, an aryl group, and an alkylaryl group, a and b are such that $a \geq 0$ and $b > 0$ and they are numbers agreeable with the valence of titanium, and m is an integer. Particularly, it is desirable to use as the oxygen-containing organic compound one wherein a is such that $0 \leq a \leq 1$ and m is such that $1 < m < 6$.

As specific examples, titanium tetraethoxide, titanium tetra-n-propoxide, titanium tetra-i-propoxide, titanium tetra-n-butoxide, and hexa-i-propoxydititanate can be mentioned. Use of an oxygen-containing organic compound having different hydrocarbon groups falls within the scope of the present invention. These oxygen-containing organic compounds are used alone or as a mixture of two or more of them.

As an organoaluminum compound that is the above-mentioned reactant (iii), one having the general formula represented by $R^1{}_3Al$ or $R^1{}_nAlY_{3-n}$ is used, in which formula $R^1$ groups may be the same or different and each represents an alkyl group having from 1 to 20, preferably from 1 to 8, carbon atoms, Y represents an alkoxy group having from 1 to 20, preferably from 1 to 8, carbon atoms, an aryloxy group, a cycloalkoxy group, or a halogen atom, and n is a number with $1 < n < 3$.

The above organoaluminum compounds may be used alone or as a mixture of two or more of them.

Specific examples of the organoaluminum compounds include triethylaluminum, tri-i-butylaluminum, diethylaluminum chloride, ethylaluminum sesquichloride, i-butylaluminum dichloride, and dientylaluminum ethoxide.

As a silicon compound that is the above-mentioned reactant (iv), the following polysiloxanes and silanes are used.

As polysiloxanes, siloxane polymers having a linear, cyclic or three-dimensional structure can be mentioned that include one type or two types of repeating units having the general formula;

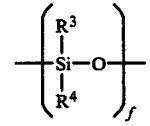

(wherein $R^3$ and $R^4$ may be the same or different and each represents an atom or a group that can bond to the silicon, such as a hydrocarbon group such as an alkyl group having from 1 to 12 carbon atoms and an aryl group, hydrogen, halogen, an alkoxy group having from 1 to 12 carbon atoms, an aryloxy group, a fatty acid residue, and f is an integer generally of from 2 to 10,000, excluding the case that all $R^3$ and $R^4$ are hydrogen or halogen), which may have various proportions and distributions in the molecule.

Specifically, linear polysiloxanes are, for example, hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, and diphenoxypolysiloxane.

Cyclic polysiloxanes are, for example, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, and octaphenylcyclotetrasiloxane.

Polysiloxanes having a three-dimensional structure are, for example, those obtained, for example, by heating the above linear or cyclic polysiloxanes, thereby allowing the polysiloxanes to have a crosslinked structure.

Desirably, these polysiloxanes are liquid in view of the handling, and it is desirable that the polysiloxanes have a viscosity in the range of 1 to 10,000 centistokes, preferably 1 to 1,000 centistokes, at 25° C. However, the polysiloxanes are not necessarily limited to liquids, and they may be solids that are generally called silicon grease.

As silanes, compounds having the general formula represented by $H_g Si_r R^5_s X_t$ (wherein $R^5$ represents a group that can bond to the silicon such as a hydrocarbon group such as an alkyl group having from 1 to 12 carbon atoms and an aryl group, an alkoxy group having 1 to 12 carbon atoms, an aryloxy group, and a fatty acid residue; X groups may be the same or different and each represents halogen; q, s, and t each are an integer of 0 or more, r is a natural number, and $q+s+t=2r+2$ or 2r) can be mentioned.

Specifically, examples include silanhydrocarbons such as trimethylphenylsilane and allyltrimethylsilane, linear and cyclic organic silanes such as hexamethyldisilane and octaphenylcyclotetrasilane, organic silanes such as methylsilane, dimethylsilane and trimethylsilane, silicon halides such as silicon tetrachloride and silicon tetrabromide, alkyl and aryl halogenosilanes such as dimethyldichlorosilane, diethyldichlorosilane, n-butyltrichlorosilane, diphenyldichlorosilane, triethylfluorosilane and dimethyldibromosilane, alkoxysilanes such as trimethylmethoxysilane, dimethyldiethoxysilane, tetramethoxysilane, diphenyldiethoxysilane, tetramethyldiethoxydisilane and dimethyl tetraethoxydisilane, haloalkoxysilanes such as dichlorodiethoxysilane, dichlorodiphenylsilane and tribromoethoxysilane and silane compounds containing a fatty acid residue such as phenoxysilane, trimethylacetoxysilane, diethyldiacetoxysilane and ethyltriacetoxysilane.

The above organosilicon compounds may be used alone or two more of them which are mixed or reacted may be used.

As an aluminum halide compound that is the abovementioned reactant (v), those having the general formula represented by $R^6_z AlX_{3-z}$ are used. In the formula, $R^6$ represents a hydrocarbon group having from 1 to 20, preferably from 1 to 8, carbon atoms, X represents a halogen atom, and z is such a number that $0 \leq z < 3$, preferably $0 \leq z \leq 2$. It is preferable that $R^6$ is selected from a linear or branched alkyl group, a cycloalkyl group, an arylalkyl group, an aryl group, and an alkylaryl group.

The above aluminum halide compounds may be used alone or as a mixture of two more of them.

Specific examples of the aluminum halide compounds include, for example, aluminum trichloride, diethylaluminum chloride, ethylaluminum dichloride, i-butylaluminum dichloride, a mixture of triethylaluminum and aluminum trichloride.

The order of reactions of the reactants (i), (ii), (iii) and/or (iv) may take any order so long as the chemical reaction proceeds. For example, a process wherein a silicon compound is added to a mixture of a magnesium compound and a titanium compound, a process wherein the above organoaluminum compound is added to a mixture of a magnesium compound and a titanium compound and then a silicon compound is added, a process wherein a magnesium compound, a titanium compound, and a silicon compound are mixed simultaneously, and a process wherein a titanium compound is added to a magnesium compound and a silicon compound, are considered.

It is preferable that these reactions are carried out in a liquid medium. For this reason, if the reactants themselves are not liquid under the operation conditions or the amounts of the liquid reactants are not enough, the reactions should be carried out in the presence of an inert organic solvent. As the inert organic solvent, any solvent can be used that is generally used in the art such as aliphatic, alicyclic, or aromatic hydrocarbons, or their halogen derivatives or their mixtures, and for example isobutane, hexane, heptane, cyclohexane, benzene, toluene, xylene, and monochlorobenzene, are preferably used.

Although the amounts of the reactants used in the present invention are not particularly limited, the atomic ratio of the gram atom of Mg in the magnesium compound of the reactant (i) to the gram atom of Ti in the titanium compound of the reactant (ii) is $1/20 \leq Mg/Ti \leq 100$, preferably $1/5 \leq Mg/T \leq 10$. If Mg/Ti is larger than this range, it becomes difficult to obtain a uniform Mg-Ti solution when the catalyst is prepared, or the activity of the catalyst lowers when the polymerization is effected. In contrast, if the Mg/Ti is smaller than this range, since the activity becomes low, such a problem arises as that the product is colored.

The atomic ratio of the gram atom of Al in the organoaluminum compound of the reactant (iii) (hereinafter referred to as "Al(iii)") of the formula $R^1_n AlY_{3-n}$ (wherein n is $1 \leq n \leq 3$) multiplied by n to the gram atom of Ti in the titanium compound of the reactant (ii) is preferably selected in such a range: $1/10 \times (n/n - 0.5) \leq n \times Al(iii)/Ti \leq 100 \times (n/n - 0.5)$, more preferably $\frac{1}{2} \times (n/n - 0.5) \leq n \times Al(iii)/Ti \leq 50 \times (n/n - 0.5)$. If $n \times Al(iii)/Ti$ is greater than the above range, the catalyst activity becomes low, and if $n \times Al(iii)/Ti$ is smaller than the above range, improvement of the powder properties cannot be expected.

It is preferable that the atomic ratio of the gram atom of Si in the silicon compound of the reactant (iv) to the gram atom of Mg in the magnesium compound of the reactant (i) is selected such that $1/20 \leq Mg/Si \leq 100$, preferably $1/5 \leq Mg/Si \leq 10$. If Mg/Si is greater than this range, improvement of the powder properties is inadequate. In contrast, if Mg/Si is smaller than this range, the activity of the catalyst will become low.

The amount of the aluminum halide compound of the reactant (v) to be used is preferably selected such that the atomic ratio of the gram atom (Al(iii)) of Al in the above organoaluminum compound (iii) to the gram atom (hereinafter referred to as Al(v)) of Al in the aluminum halide compound (v) is $1/20 \leq Al(iii)/Al(v) \leq 10$ and $\frac{1}{2} \leq p$, preferably $1/10 \leq Al(iii)/Al(v) \leq 5$ and $4/5 \leq p$, with $p = X/(4 \times Ti + 2 \times Mg + s)$ wherein Ti and X represent the gram atom of titanium and the gram atom of halogen respectively, Mg represents the gram atom of metal magnesium or Mg in the magnesium compound, and s represents the gram atom of the alkoxy group or aryloxy group in the silicon compound. If the atomic ratio of Al (iii)/Al (v) falls outside this range, improvement of the powder properties is not expected, and if p is smaller than this range, the activity of the catalyst will become low.

Although the reaction conditions of the steps are not particularly critical, each reaction is carried out at a temperature in the range of from $-50$ to $300°$ C., preferably from 0 to $200°$ C. for from 0.5 to 50 hours, preferably from 1 to 6 hours, under normal pressure or under raised pressure in an inert gas atomsphere.

After the thus prepared solid composite is freed from remaining unreacted substances and by-products by filtering or decantation, the solid composite washed with an inert organic solvent several times, is suspended in an inert organic solvent, and is brought in contact with ethylene and/or an α-olefin.

As the α-olefin to be brought in contact with the solid composite so that the α-olefin will be absorbed in the solid composite, for example, propylene, 1-butene, 1-pentene, 3 methyl-1-pentene, 2-methyl-1-pentene, 4-methyl-1-pentene, and 1-octene can be mentioned. The contact with the solid composite is carried out by allowing ethylene and one or more of these α-olefins to be absorbed in the solid composite or allowing one or more of these α-olefins to be absorbed in the solid composite, but preferably by allowing ethylene and one or more of other α-olefins to be absorbed in the solid composite.

The total amount of ethylene and α-olefins to be absorbed by the contact is preferably in the range of from 0.001 to 20 parts by weight, more preferably from 0.01 to 10 parts by weight, per part by weight of the solid composite. If the amount of α-olefins to be absorbed is too small, the uncrumbling property of the catalyst is not adequate. If two or more α-olefins are used, $Cm \leq Cn$ is preferable wherein the absorption of he α-olefin having m carbon atoms is Cm and the absorption of the α-olefin having n carbon atoms is Cn with $n \leq m$ and $n \geq 3$. If this relationship is not satisfied, sometimes the powder properties of the polymer may be deteriorated. The contact treatment can be carried out in a gas phase, or without any solvent, or in the presence of an inert organic solvent. If the contact treatment is carried out in the presence of an inert organic solvent, the organic solvent is the same as that used in the production of the solid composite.

Although the contact conditions are not particularly limited, it is required that the contact is carried out under conditions substantially without oxygen and water or the like. However, in the so-called preliminary polymerization wherein the solid composite is brought in contact with an α-olefin in the presence of the catalyst component (B), the effect of the present invention cannot be obtained. Generally, this contact treatment can be carried out at a temperature in the range of from $-50$ to $150°$ C., preferably from 0 to $100°$ C. under normal pressure or under raised pressure, and if the contact treatment is carried out in a gas phase, it is preferably carried out under fluidized conditions, and if the contact treatment is carried out in a liquid phase, it is preferably carried out with stirring so that intimate contact can be made.

Although the amount of the solid composite to be used is not particularly limited, the amount thereof is preferably from 0.1 to 200 g per liter of the solvent or per liter of the reactor. It is also carried out in the presence of hydrogen.

After the contact treatment, washing with an inert organic solvent may or may not follow.

Although the thus obtained catalyst component (A) which is in a suspended state may be used in the polymerization, in some cases, it may be used after separated from the solvent and optionally after dried by heating it under normal pressure or under reduced pressure to remove the solvent.

In the present invention, as an organometallic compound of a metal of Groups Ia, IIa, IIb, IIIb, and IVb of the Periodic Table that is the catalyst component (B), an organometallic compound comprising a metal such as lithium, magnesium, zinc, tin, and aluminum and an organic group can be mentioned.

As the above organic group, an alkyl group can be mentioned typically. As this alkyl group, a linear or branched alkyl group having 1 to 20 carbon atoms is us Specific examples include n-butyllithium, diethylmagnesium, diethylzinc, trimethylaluminum, triethylaluminum, tri-i-butylaluminum, tri-n-butylaluminum, tri-n-decylaluminum, tetraethyltin, and tetrabutyltin. In particular, a trialkylaluminum having a linear or branched alkyl group having 1 to 10 carbon atoms is preferably used.

As the component (B), an alkyl metal hydride having an alkyl group with 1 to 20 carbon atoms can also be used. As specific examples of such a compound, diisobutylaluminum hydride and trimethyltin hydride can be mentioned. It is also possible to use an alkylmetal halide having an alkyl group with 1 to 20 carbon atoms such as ethylaluminum sesquichloride, diethylaluminum chloride, and diisobutylaluminum chloride, and an alkylmetal alkoxide such as diethylaluminum ethoxide.

It is also possible to use an organoaluminum compound obtained by reaction of a trialkylaluminum having an alkyl group with 1 to 20 carbon atoms or a dialkylaluminum hydride with a diolefin having 4 to 20 carbon atoms such as isoprenylaluminum.

The polymerization of an olefin according to the present invention is carried out under reaction conditions generally used in the so-called Ziegler process in the presence or absence of an inert solvent in a liquid phase or a gas phase. In the case of liquid phase polymerization, slurry polymerization is preferable. That is, the polymerization is carried out continuously or batchwise at a temperature of 20 to $110°$ C. Although the polymerization pressure is not particularly limited, the polymerization is suitably carried out under pressure, particularly using a pressure of 1.5 to 50 kg/cm$^2$G. If the polymerization is carried out in the presence of an inert solvent, any solvent usually used can be employed as the inert solvent. Particularly, use of an alkane or cycloalkane having 4 to 20 carbon atoms such as isobutane, pentane, hexane and cyclohexane is suitable.

In the practice of the present invention, the amount of the catalyst component (A) to be used is from 0.001 to 2.5 mmol in terms of titanium atoms per liter of the solvent or per liter of the reactor, and depending on the conditions, a higher concentration may be used.

The organometallic compound of the component (B) is used at a concentration of from 0.02 to 50 mmol, preferably from 0.2 to 5 mmol, per liter of the solvent or per liter of the reactor.

As the olefin to be polymerized according to the present method of producing a polyolefin, α-olefins having the general formula represented by R—CH=CH$_2$ wherein R represents hydrogen or a linear or branched and substituted or unsubstituted alkyl group having 1 to 10, particularly 1 to 8, carbon atoms can be mentioned. As specific examples, ethylene, propylene, 1-butene, 1-pentene, 4-methyl-1-pentene, and 1-octene can be mentioned. A mixture of two or more of them or a mixture of an α-olefin and a diene such as butadiene and isoprene can also be used for copolymerization. Particularly, use of ethylene, a mixture of ethylene and α-olefin other than ethylene, or a mixture of ethylene and a diene is preferable.

In the present invention, the molecular weight of the polymer to be produced can be controlled by known means, i.e., for example, by allowing a suitable amount of hydrogen to be present in the reaction system.

A first effect of the present invention resides in that the improvement of the powder properties of the polymer are remarkable. That is, according to the present invention, a polymer can be obtained whose catalyst particles crumble less in the transportation step and polymerization step and wherein the particle size distribution is quite narrow, the content of fine particles is small, the average particle diameter is large, and the bulk density is high. In particular, the fact that the above effect has been attained by applying the present invention to a catalyst that can provide a polymer having a wide molecular weight distribution is very significant. That is, production of matter adhering to the polymerization apparatus in the polymerization step can be prevented, and separation and filtration of the polymer slurry become easy in the separation and drying step of the polymer so that fine particles of the polymer can be prevented from flying to the outside of the system. In addition, since the flowability is improved, the drying efficiency is improved. In the transportation step, bridges would not be formed in the silo, therefore troubles in transportation are eliminated, and granulation can be carried out quite smoothly. Further, when the particle size distribution of the polymer is narrow, in the case wherein a polymer having a wider molecular weight distribution is produced by the multi-stage polymerization, classification of the particles takes place hardly and homogeneous particles can be obtained, so that a molded product which has no hard spots or the like but is uniform can be obtained.

A second effect of the present invention is that the catalyst activity is high, and in other words, the weight of the polymer obtained per unit weight of the catalyst component (A) is remarkably high. Therefore, it is not needed to remove the catalyst residue from the polymer by using any particular means, and problems such as deterioration or coloring at the time of molding of the polymer can be avoided.

DETAILED DESCRIPTION OF THE PREFERRED EMBODIMENTS

Now, the present invention will be described with reference to Examples, which are not intended to restrict the present invention. In the Examples and Comparative Examples, HLMI/MI stands for the ratio of the high-load melt index (HLMI; under conditions F of ASTMD-1238) to the melt index (MI; under conditions E of ASTMD-1238), and is a scale for the molecular weight distribution. If the HLMI/MI value is small, the molecular weight distribution is considered narrow.

The activity shows the produced amount (g) of a polymer per gram of the catalyst component (A). With respect to the width of the particle diameter distribution of the polymer particles, the results of he classification of the polymer particles by sieves are plotted on a probability logarithmic paper to find the geometric standard deviation from the approximated straight line in known manner, and the width is expressed in terms of its common logarithm (hereinafter referred to as σ). The average particle diameter is a value obtained by reading the particle diameter corresponding to the weight accumulated value 50% of the above approximated line.

With respect to the crumbliness rate, a flask containing the catalyst slurry is exposed to 10 liters of water in a ultrasonic wave washing apparatus with a frequency of 28 kHz for 2 min. Thereafter, the polymerization is carried out, and the particle diameter of the obtained polymer particles is designated W2. By designating the particle diameter of the polymer particles polymerized by using the catalyst not exposed to the ultrasonic waves to be W1, the crumbliness rate can be expressed in percentages from (W1−W2)/W1.

REFERENCE EXAMPLE 1

(a) Preparation of Solid Composite 140 g (1.89 mol) of n-butanol and 246 g (1.89 mol) of 2-ethyl-hexylalcohol were placed in a 10 liter-autoclave equipped with a stirrer, then 2 g of iodine, 40 g (1.65 mol) of metal magnesium powder, and 56.0 g (0.165 mol) of titanium tetrabutoxide were added thereto, and then after 2720 ml of hexane were added, the temperature was elevated to 80° C., and the mixture was stirred for 1 hour under sealing with nitrogen while removing the evolved hydrogen gas. Then, the temperature was elevated to 120° C. for 1 hour to continue the reaction, thereby obtaining an Mg-Ti solution.

While the internal temperature was kept at 45° C., a 30% hexane solution of diethylaluminum chloride (1.65 mol) was added over 1 hour. After the completion of the addition, the mixture was stirred for 1 hour at 60° C. Then, 198 g of methylhydropolysiloxane (whose viscosity was about 30 centistokes at 25° C.) (3.3 atomic grams of silicon) were added, and the mixture was reacted for 1 hour under reflux. After cooling to 45° C., 3670 ml of a 50% hexane solution of i-butylaluminum dichloride were added over 2 hours. After the completion of the addition, the mixture was stirred for 1 hour at 70° C. Hexane was added to the product, and washing was made 15 times by decantation. Thus, a slurry of a solid composite suspended in hexane was obtained, which contained 209 g of the solid composite. A part of the slurry was taken out, the supernatant liquid was removed, the solid composite was dried under a nitrogen atmosphere, and the elemental analysis was carried out to find that Ti was 4.1% by weight.

EXAMPLE 1

(a) Preparation of Catalyst Component (A)

The internal atmosphere of a stainless steel autoclave having an internal volume of 2 liters and equipped with a magnetic stirrer was replaced well with nitrogen and the hexane slurry of the solid composite obtained in Reference Example 1 was charged thereinto so that the amount of the solid composite might be 20 g. While the internal temperature of the autoclave was kept at 45° C., 2 ml of butene-1 was added and brought in contact with the slurry over 30 min. Then, the gas phase was replaced with nitrogen, and after ethylene was charged thereinto at a rate of 50 ml/min over 30 min, the mixture was kept at 45° C. for 30 min. By this procedure, it is considered that 0.12 g of butene-1 and 0.2 g of ethylene was not used, and in Example 5, the internal temperature was kept at 45° C., 4 ml of butene-1 was added, and after ethylene was added at a rate of 50 ml/min for 30 min, the temperature was kept at 45° C. for 30 min, thereby preparing catalyst components (A).

Polymerization of ethylene was carried out in the same manner as in Example 1, and the results of the polymerization are shown in Table 1.

TABLE 1

| Example | Method of preparation of solid composite | Type of α-Olefin | Absorption Ratio (g/g) | Type of α-Olefin | Absorption Ratio (g/g) | Activity (g/g) | MI (g/10 min) | HLMI/MI | Bulk density (g/cm$^3$) | Fine particle content (%) | σ | Average particle diameter (μm) | Crumbliness ratio (%) |
|---|---|---|---|---|---|---|---|---|---|---|---|---|---|
| 1 | Reference Example 1 | butene-1 | 0.06 | ethylene | 0.1 | 40200 | 0.47 | 48 | 0.39 | 6.3 | 0.19 | 290 | 0 |
| 2 | Reference Example 1 | butene-1 | 0.12 | ethylene | 0.1 | 47800 | 0.47 | 47 | 0.40 | 7.9 | 0.19 | 270 | 0 |
| 3 | Reference Example 1 | butene-1 | 0.30 | ethylene | 0.1 | 42000 | 0.47 | 51 | 0.40 | 8.0 | 0.14 | 260 | 0 |
| 4 | Reference Example 1 | butene-1 | 0.12 | ethylene | 0.1 | 42300 | 0.46 | 49 | 0.42 | 8.3 | 0.22 | 290 | 0 |
| 5 | Reference Example 1 | butene-1 | 0.12 | ethylene | 0.1 | 51000 | 0.22 | 51 | 0.40 | 5.4 | 0.19 | 260 | 10 |
| 6 | Reference Example 1 | ethylene | 0.2 | | | 42300 | 0.26 | 51 | 0.31 | 7.5 | 0.21 | 250 | 5 | were absorbed per gram of the solid composite. (hereinafter, the absorbed amount (g/g) of the olefin per gram of the solid composite is referred to as absorption ratio). Thus, a catalyst component (A) suspended in hexane was obtained.

(b) Polymerization of Ethylene

The internal atmosphere of a stainless steel autoclave having an internal volume of 2 liters and equipped with a magnetic stirrer was replaced well with nitrogen, 1.2 liters of hexane was charged thereinto, and the internal temperature was adjusted to 80° C. Thereafter, as the catalyst component (B), 0.23 g (1.2 mmol) of tri-i-butylaluminum and the slurry containing 11.6 mg of the catalyst component (A) obtained in (a) were successively added. After the internal pressure of the autoclave was adjusted to 1 kg/cm$^2$G, 4 kg/cm$^2$ of hydrogen was added, and while ethylene was continuously added so that the internal pressure of the autoclave might be 11.0 kg/cm$^2$G, the polymerization was carried out for 1.5 hours. After the completion of the polymerization, the mixture was cooled, the unreacted gas was expelled, the polyethylene slurry was removed, and the product was separated from the solvent by filtering and was dried.

As a result, 402 g of polyethylene having a melt index of 0.47 g/10 min, an HLMI/MI of 48, and a bulk density of 0.39 g/cm$^3$ was obtained. The produced amount per gram of the solid catalyst component (A) (hereinafter referred to as activity) was 40200 g/g. The average particle diameter was 290 μm, the proportion of fine particles having a particle diameter of 105 μm or below (hereinafter referred to as fine particle content) was 6.3% by weight, σ was 0.19, and the crumbliness rate was 0%.

EXAMPLES 2 to 6

Example 1 was repeated, except that the absorbed amounts of butene-1 and ethylene into 20 g of the solid composite obtained in Reference Example 1 were changed as shown in Table 1; and in Example 4, before ethylene was charged, 0.5 kg/cm$^2$G of hydrogen was charged into the autoclave, and in Example 6. butene-1

REFERENCE EXAMPLE 2

(a) Preparation of Solid Composite

Reference Example 1 was repeated, except that the amount of titanium tetrabutoxide was changed to 28 g (0.082 mol), thereby preparing an Mg-Ti solution.

Then, in the same manner as in Reference Example 1 a 30% hexane solution of diethylaluminum chloride (0.82 mol), 99 g of methylhydropolysiloxane (having a viscosity of about 30 centistokes at 25° C.) (1.65 atomic grams in terms of silicon), and 3060 ml of a 50% hexane solution of i-butylaluminum dichloride was added over 2 hours. After the completion of the addition, the mixture was stirred for 1 hour at 70° C. Hexane was added to the product, and the product was washed 15 times by decantation. Thus, a slurry of a solid composite suspended in hexane (containing 197 g of the solid composite A) was obtained. A part of the slurry was taken out, the supernatant liquid was removed, the solid composite was dried under a nitrogen atmosphere, and the elemental analysis was carried out to find that Ti was 2.0% by weight.

EXAMPLES 7 to 9

Example 1 was repeated, except that in Examples 7 and 8, the absorbed amounts of 4-methyl-pentene-1 and ethylene into 20 g of the solid composite obtained in Reference Example 2 were changed as shown in Table 1, and in Example 9, the absorbed amount of butene-1 and ethylene into 20 g of the solid composite obtained in Reference Example 2 were changed as shown in Table 1, thereby preparing catalyst components (A).

Polymerization of ethylene was then carried out in the same manner as in Example 1, and the results are shown in Table 2.

REFERENCE EXAMPLE 3

(a) Preparation of Solid Composite

Reference Example 1 was repeated, except that the amount of titanium tetrabutoxide was changed to 140 g (0.41 mol), thereby preparing an Mg-Ti solution.

Then, in the same manner as in Reference Example 1, a 30% hexane solution of diethylaluminum chloride (3.3 mol), 248 g of methylhydropolysiloxane (having a viscosity of about 30 centistokes at 25° C.) (4.12 atomic grams in terms of silicon), and 2075 ml of a 50% hexane solution of i-butylaluminum dichloride were added over 2 hours. After the completion of the addition, the mixture was stirred for 1 hour at 70° C. Hexane was added to the product, and the product was washed 15 times by decantation. Thus, a slurry of a solid composite suspended in hexane (containing 265 g of the solid composite A) was obtained. A part of the slurry was taken out, the supernatant liquid was removed, the solid composite was dried under a nitrogen atmosphere, and the elemental analysis was carried out to find that Ti was 6.9% by weight.

EXAMPLES 10 to 12

Example 1 was repeated, except that the absorbed amount of propylene in Example 10, the absorbed amounts of butene-1 and ethylene in Example 11, and the absorbed amount of ethylene in Example 12, respectively into 20 g of the solid composite obtained in Reference Example 3, were changed as shown in Table 2, thereby preparing catalyst components (A).

Polymerization of ethylene was then carried out in the same manner as in Example 1, and the results are shown in Table 2.

COMPARATIVE EXAMPLES 1 to 5

In Comparative Example 1, the solid composite obtained in Reference Example 1 was used instead of the catalyst component (A).

In Comparative Example 2, instead of the catalyst component (A), use was made of one obtained by following Example 1, except that the absorbed amounts of butene-1 and ethylene into 20 g of the solid composite obtained in Reference Example 1 were changed as shown in Table 3.

In Comparative Example 5, instead of the catalyst component (A), use was made of one obtained by following Example 1, except that the absorbed amount of propylene into 20 g of the solid composite obtained in Reference Example 1 was changed as shown in Table 3. However, in Comparative Examples 2 and 5, before the addition of the olefin, 16 mmol and 29 mmol of triisobutylaluminum were respectively added.

In Comparative Examples 3 and 4, those obtained in Reference Examples 2 and 3 were respectively used instead of the catalyst component (A).

Polymerization of ethylene was carried out in the same manner as in Example 1. The results of the polymerization are shown in Table 3. In Comparative Examples, the crumbliness ratio became large, and in Comparative Example 2, the particle diameter became small and in Comparative Examples 2 and 5, the particle size distribution became wide.

TABLE 3

| Comparative Example | Method of preparation of solid composite | Type of α-Olefin | Absorption Ratio (g/g) | Type of α-Olefin | Absorption Ratio (g/g) | Activity (g/g) | MI (g/10 min) | HLMI/MI | Bulk density (g/cm³) | Fine particle content (%) | σ | Average particle diameter (μm) | Crumbliness ratio (%) |
| --- | --- | --- | --- | --- | --- | --- | --- | --- | --- | --- | --- | --- | --- |
| 1 | Reference Example 1 | | | | | 47200 | 0.52 | 49 | 0.33 | 13.5 | 0.16 | 170 | 30 |
| 2* | Reference Example 1 | butene-1 | 0.06 | ethylene | 0.1 | 42400 | 0.31 | 51 | 0.39 | 14.1 | 0.27 | 220 | 5 |
| 3 | Reference Example 2 | | | | | 33900 | 0.51 | 54 | 0.33 | 14.0 | 0.20 | 200 | 35 |
| 4 | Reference Example 3 | | | | | 33900 | 1.43 | 32 | 0.43 | 2.3 | 0.18 | 520 | 25 |
| 5* | Reference Example 3 | propylene | 3.0 | | | 34100 | 0.77 | 33 | 0.40 | 5.1 | 0.27 | 640 | 15 |

*In Comparative Examples 2 and 5, before the addition of the olefin, 16 mmol and 29 mmol of triisobutylaluminum were respectively added.

TABLE 2

| Example | Method of preparation of solid composite | Type of α-Olefin | Absorption Ratio (g/g) | Type of α-Olefin | Absorption Ratio (g/g) | Activity (g/g) | MI (g/10 min) | HLMI/MI | Bulk density (g/cm³) | Fine particle content (%) | σ | Average particle diameter (μm) | Crumbliness ratio (%) |
| --- | --- | --- | --- | --- | --- | --- | --- | --- | --- | --- | --- | --- | --- |
| 7 | Reference Example 2 | 4-methylpentene-1 | 0.1 | ethylene | 0.2 | 32000 | 0.42 | 54 | 0.42 | 6.3 | 0.20 | 260 | 0 |
| 8 | Reference Example 2 | 4-methylpentene-1 | 0.2 | ethylene | 0.1 | 33200 | 0.54 | 54 | 0.36 | 7.1 | 0.22 | 260 | 0 |
| 9 | Reference Example 2 | butene-1 | 0.1 | ethylene | 0.2 | 34700 | 0.17 | 58 | 0.38 | 3.8 | 0.20 | 330 | 0 |
| 10 | Reference Example 3 | propylene | 3.0 | | | 32500 | 0.48 | 54 | 0.42 | 0.9 | 0.21 | 710 | 0 |
| 11 | Reference Example 3 | butene-1 | 0.05 | ethylene | 0.1 | 36700 | 1.11 | 33 | 0.43 | 0.2 | 0.18 | 710 | 0 |
| 12 | Reference Example 3 | ethylene | 0.15 | | | 36700 | 1.22 | 32 | 0.42 | 0.2 | 0.18 | 720 | 10 |

What is claimed is:

1. A method of producing a polyolefin, which comprises polymerizing at least one olefin in the presence of a catalyst system comprising:
   (A) a catalyst component prepared by reacting, in the absence of ethylene and/or α-olefin and in the absence of (B), a uniform solution containing
     (i) at least one member selected from the group consisting of metal magnesium and hydroxylated organic compound, and oxygen-containing organic compounds of magnesium and
(ii) at least one oxygen-containing organic compound of titanium with
(iii) at least an organoaluminum compound and/or
(iv) at least one silicon compound, with
(v) at least one aluminum halide compound,
freeing the resulting solid composite reaction product from the remaining unreacted substances and by-products by filtering or decantation, then washing the composite with an inert organic solvent, and contacting the resulting composite, in the absence of (B), with ethylene and/or one α-olefin thereby absorbing the ethylene and/or the α-olefin into the solid composite, wherein the total amount of ethylene and/or an α-olefin absorbed by the contact with the solid composite is in the range of from 0.001 to 20 parts by weight per part by weight of the solid composite,
and thereafter adding
(B) at least one catalyst component selected from the group consisting of organometallic compounds of metals of Groups Ia, IIa, IIb, IIIb and IVb of the Periodic Table.

2. The method according to claim 1, wherein the reactants (i) are at least one member selected from the group consisting of metal magnesium and alcohols, organosilanols or phenols, and magnesium alkoxides, magnesium alkylalkoxides, magnesium hydroalkoxides, magnesium phenoxides, magnesium carboxylates, magnesium oxymates, magnesium hydroxamates, magnesium hydroxylamine salts, magnesium silanolates and complex alkoxides of magnesium with other metals;

the reactant (ii) is a compound having the formula of $[TiO_a(OR^2)_b]_m$ in which $R^2$ is a linear or branched alkyl group having from 1 to 20 carbon atoms, a cycloalkyl group, an arylalkyl group, an aryl group, and an alkylaryl group, a and b are such that $a \geq 0$ and $b > 0$ and they are numbers agreeable with the valence of titanium, and m is an integer;

the reactant (iii) is a compound having the formula of $R^1{}_3Al$ or $R^1{}_nAlY_{3-n}$ in which $R^1$ may be the same or different and is an alkyl group having from 1 to 20 carbon atoms, Y is an alkoxy group having from 1 to 20 carbon atoms, an aryloxy group, a cycloalkoxy group, or a halogen atom, and n is a number with $1 \leq n < 3$;

the reactant (iv) is a polysiloxane having a linear, cyclic or three-dimensional structure that includes one type or two types of repeating units having the formula,

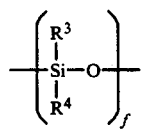

(wherein $R^3$ and $R^4$ may be the same or different and each represents an alkyl group having from 1 to 12 carbon atoms, an aryl group, hydrogen, halogen, an alkoxy group having from 1 to 12 carbon atoms, an aryloxy group, or a fatty acid residue, which can bond to the silicon, and f is an integer of from 1 to 10,000, excluding the case that all $R^3$ and $R^4$ are hydrogen or halogen), or a silane having the formula of $H_q Si_r R^5{}_s X_t$ (wherein $R^5$ is an alkyl group having from 1 to 12 carbon atoms, an aryl group, an alkoxy group having from 1 to 12 carbon atoms, an aryloxy group, or a fatty acid residue, which can bond to the silicon, X is the same or different halogen, q, s, and t each are an integer of 0 or more, r is a natural number, and $q+s+t=2r+2$ or $2r$);

the reactant (v) is an aluminum halide compound having the formula of $R^6{}_zAlX_{3-z}$ in which $R^6$ is a hydrocarbon group having from 1 to 20 carbon atoms, X is a halogen atom, and z is such a number that $0 \leq z < 3$; and the component (B) is at least one organometallic compound selected form the group consisting of a $C_{1-20}$ alkyl metal, a $C_{1-20}$ alkyl metal hydride, a $C_{10-20}$ alkyl metal halide, a $C_{1-20}$ alkyl metal alkoxide, and an organoaluminum compound obtained by reaction of a trialkylaluminum having an alkyl group with from 1 to 20 carbon atoms or a dialkyl-aluminum hydride with a diolefin having from 4 to 20 carbon atoms.

3. The method according to claim 2, wherein the metal of the component (B) is selected from the group consisting of lithium, magnesium, zinc, tin and aluminum.

4. The method according to claim 1, wherein the α-olefin brought in contact with the solid composite is at least one member selected from the group consisting of propylene, 1-butene, 1-pentene, 3-methyl-1-pentene, 2-methyl-1-pentene, 4-methyl-1-pentene, and 1-octene.

5. The method according to claim 1, wherein the contacting is carried out at a temperature in the range of from $-50$ to $150°$ C.

6. The method according to claim 1, wherein the catalyst component (A) is used at a concentration of from 0.001 to 2.5 mmol in terms of titanium atoms per liter of a solvent or per liter of a reactor, and the organometallic compound of the component (B) is used at a concentration of from 0.02 to 50 mmol per liter of a solvent or per liter of a reactor.

7. The method according to claim 1, wherein the olefin to be polymerized is at least one of α-olefin having the formula of $R-CH=CH_2$ (wherein R represents hydrogen or a linear or branced and substituted or unsubstituted alkyl group having 1 to 10 carbon atoms), and a mixture of the α-olefin and a diene.

8. The method according to claim 7, wherein the α-olefin is at least one member selected from the group consisting of ethylene, propylene, 1-butene, 1-pentene, 4-methyl-1-pentene, and 1-octene, and the diene is at least one of butadiene and isoprene.

9. The method according to claim 1, wherein the polymerization is carried out continuously or batchwise at a temperature of from 20 to 110° C. under a pressure of from 1.5 to 50 kg/cm²G.

10. The method according to claim 1, wherein
(i) is magnesium and 2-ethyl-hexylalcohol,
(ii) is titanium tetrabutoxide,
(iii) is diethylaluminum chloride,
(iv) is methylhydropolysiloxane, and
(v) is butylaluminum dichloride.

* * * * *